United States Patent
Park et al.

(10) Patent No.: US 9,829,392 B2
(45) Date of Patent: Nov. 28, 2017

(54) APPARATUS AND METHOD FOR ESTIMATING TEMPERATURE OF MOTOR USING HALL SENSOR

(71) Applicant: KOREA ELECTRONICS TECHNOLOGY INSTITUTE, Seongnam-si, Gyeonggi-do (KR)

(72) Inventors: Joon Sung Park, Seoul (KR); Se Hyun Rhyu, Bucheon-si (KR); In Soung Jung, Seoul (KR); Jun Hyuk Choi, Seoul (KR); Bon Gwan Gu, Bucheon-si (KR); Jin Hong Kim, Suwon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 866 days.

(21) Appl. No.: 14/245,202

(22) Filed: Apr. 4, 2014

(65) Prior Publication Data
US 2014/0369385 A1 Dec. 18, 2014

(30) Foreign Application Priority Data
Jun. 18, 2013 (KR) .................. 10-2013-0069649

(51) Int. Cl.
*G01K 7/00* (2006.01)
*G01K 7/36* (2006.01)
*G01K 13/08* (2006.01)

(52) U.S. Cl.
CPC .............. *G01K 7/36* (2013.01); *G01K 13/08* (2013.01)

(58) Field of Classification Search
CPC .................................. G01K 7/36; G01K 13/08
(Continued)

(56) References Cited

U.S. PATENT DOCUMENTS

| 7,786,686 B2 * | 8/2010 | D'Angelo ............... H02P 6/182 |
| | | 318/400.01 |
| 2003/0156147 A1 * | 8/2003 | Misumi ................ B41J 2/04528 |
| | | 347/17 |

(Continued)

FOREIGN PATENT DOCUMENTS

| KR | 1019950017431 A | 7/1995 |
| KR | 1020110114976 A | 10/2011 |
| KR | 1020130020258 A | 2/2013 |

OTHER PUBLICATIONS

Korean Notice of Allowance for application No. 10-2013-0069649 dated Oct. 30, 2014.

*Primary Examiner* — Lisa Caputo
*Assistant Examiner* — Janice M Soto
(74) *Attorney, Agent, or Firm* — Hauptman Ham, LLP

(57) ABSTRACT

The present disclosure relates to an apparatus and method for estimating a temperature of a motor using a Hall sensor. The method includes detecting, at a digital Hall sensor, a position of a rotor included in a motor and outputting an on signal in an operating period and an off signal in a release period according to a relative position of the rotor, calculating, at a temperature determining module, a difference between duration of the operating period and duration of the release period according to an output waveform of the digital Hall sensor, and then determining, at the temperature determining module, a temperature of the motor with reference to a temperature corresponding to the duration difference. Accordingly, it is possible to estimate the internal temperature of a motor without installing a temperature sensor in the motor, to maintain a small size of the motor, and to reduce production costs.

15 Claims, 7 Drawing Sheets

(58) Field of Classification Search
USPC .......................................................... 374/170
See application file for complete search history.

(56) References Cited

U.S. PATENT DOCUMENTS

| | | | |
|---|---|---|---|
| 2005/0156545 A1* | 7/2005 | Mueller | G05B 19/291 318/273 |
| 2012/0212169 A1* | 8/2012 | Wu | H02P 7/285 318/432 |

* cited by examiner

APPARATUS AND METHOD FOR ESTIMATING TEMPERATURE OF MOTOR USING HALL SENSOR

CROSS-REFERENCE TO RELATED APPLICATION

This application claims priority to and benefit of Patent Application Serial No. 10-2013-0069649, filed on Jun. 18, 2013 in Korea, which is hereby incorporated by reference herein in its entirety.

TECHNICAL FIELD

The present disclosure relates to temperature measurement technology and, more particularly, to an apparatus and method for estimating a temperature of a motor using a Hall sensor in which the internal temperature of the motor can be estimated without being measured by a temperature sensor.

BACKGROUND

Various types of industrial machinery, automation equipment, vehicles, robots, mechanical devices having artificial intelligence (AI), etc. have electric motors for transmitting rotation power. Such a motor has been developed from a direct current (DC) motor whose rotor consists of a coil into a brushless DC (BLDC) motor whose rotor consists of a permanent magnet.

In such a motor, demagnetization in which the magnetic force of a magnet weakens according to a change in temperature occurs. Within a predetermined temperature range, reversible demagnetization occurs so that magnetic flux may return to its original state when the temperature returns to its original value. However, when the temperature exceeds a predetermined value, irreversible demagnetization in which magnetic flux does not return to its original state occurs, and the life span of the motor shortens.

For this reason, according to the related art, a temperature sensor is attached inside a motor to measure the temperature. In this case, due to an additional circuit configuration and wiring, the cost and volume of the motor increase, and also the complexity of the motor increases. In addition, since the motor has a small space therein, it may be difficult to install the temperature sensor, and wrong information may be obtained when a signal line of the temperature sensor is closed or opened.

SUMMARY

The present disclosure is directed to providing an apparatus and method for estimating a temperature of a motor using a Hall sensor in which the internal temperature of the motor can be estimated using an output signal of a Hall sensor that detects the position of a rotor in the motor.

In accordance with some embodiments, a method of estimating a temperature of a motor using a Hall sensor includes a step of detecting, at a digital Hall sensor, a position of a rotor included in a motor, and outputting an on signal in an operating period and an off signal in a release period according to a relative position of the rotor, a step of calculating, at a temperature determining module, a difference between duration of the operating period and duration of the release period according to an output waveform of the digital Hall sensor, and a step of determining, at the temperature determining module, a temperature of the motor with reference to a temperature corresponding to the duration difference.

In the method of estimating a temperature of a motor using a Hall sensor according to the embodiments, the step of determining the temperature may include, when the duration difference has a value within a specific range, determining the temperature of the motor.

In the method of estimating a temperature of a motor using a Hall sensor according to the embodiments, the step of determining the temperature may include, when a plurality of temperatures correspond to the duration difference, determining the actual temperature of the motor among the plurality of temperatures with reference to a temperature determined in a previous cycle.

In the method of estimating a temperature of a motor using a Hall sensor according to the embodiments, the step of determining the temperature may include, when the temperature determining module determines that a plurality of temperatures correspond to the duration difference, determining the actual temperature of the motor among the plurality of temperatures with reference to a time interval between an operating point at which the operating period begins in a specific cycle and an operating point at which the operating period begins in a next cycle.

In the method of estimating a temperature of a motor using a Hall sensor according to the embodiments, the step of determining the temperature may include, when the temperature determining module determines that a plurality of temperatures correspond to the duration difference, determining the actual temperature of the motor among the plurality of temperatures with reference to a time interval between a release point at which the release period begins in a specific cycle and a release point at which the release period begins in a next cycle.

The method of estimating a temperature of a motor using a Hall sensor according to the embodiments may further include, before the step of determining the temperature, storing temperature information corresponding to the duration difference between the operating period and the release period, and the step of determining the temperature may include determining the temperature of the motor with reference to the stored temperature information.

In the method of estimating a temperature of a motor using a Hall sensor according to the embodiments, the temperature information corresponding to the duration difference between the operating period and the release period may be created based on a data sheet provided by a manufacturer of the motor or the digital Hall sensor.

In accordance with some embodiments, an apparatus for estimating a temperature of a motor using a Hall sensor includes a digital Hall sensor configured to detect a position of a rotor included in a motor, and output an on signal in an operating period and an off signal in a release period according to a relative position of the rotor, and a temperature determining module configured to calculate a difference between duration of the operating period and duration of the release period according to an output waveform of the digital Hall sensor, and determine a temperature of the motor with reference to a temperature corresponding to the duration difference.

In the apparatus for estimating a temperature of a motor using a Hall sensor according to the embodiments, when the duration difference has a value within a specific range, the temperature determining module may determine the temperature of the motor.

In the apparatus for estimating a temperature of a motor using a Hall sensor according to the embodiments, when a plurality of temperatures correspond to the duration difference, the temperature determining module may determine the actual temperature of the motor among the plurality of temperatures with reference to a temperature determined in a previous cycle.

In the apparatus for estimating a temperature of a motor using a Hall sensor according to the embodiments, when a plurality of temperatures correspond to the duration difference, the temperature determining module may determine the actual temperature of the motor among the plurality of temperatures with reference to a time interval between a release point at which the operating period begins in a specific cycle and a release point at which the operating period begins in a next cycle.

In the apparatus for estimating a temperature of a motor using a Hall sensor according to the embodiments, when a plurality of temperatures correspond to the duration difference, the temperature determining module may determine the actual temperature of the motor among the plurality of temperatures with reference to a time interval between a release point at which the release period begins in a specific cycle and a release point at which the release period begins in a next cycle.

In the apparatus for estimating a temperature of a motor using a Hall sensor according to the embodiments, the temperature determining module may include a storage configured to store temperature information on the motor corresponding to the duration difference between the operating period and the release period, a calculator configured to calculate the duration difference and look up a temperature corresponding to the duration difference in the storage, and at least one of an output unit configured to output information on the temperature looked up by the calculator and a communicator configured to transmit the information on the temperature looked up by the calculator.

In the apparatus for estimating a temperature of a motor using a Hall sensor according to the embodiments, the temperature information stored in the storage may be created based on a data sheet provided by a manufacturer of the motor or the digital Hall sensor.

In accordance with some embodiments, an apparatus for estimating a temperature of a motor using a Hall sensor includes a motor including a rotor, a digital Hall sensor configured to detect a position of the rotor, and output an on signal in an operating period and an off signal in a release period according to a relative position of the rotor, and a temperature determining module configured to calculate a difference between duration of the operating period and duration of the release period according to an output waveform of the digital Hall sensor, and determine a temperature of the motor with reference to a temperature corresponding to the duration difference.

DETAILED DESCRIPTION

Figure 1:
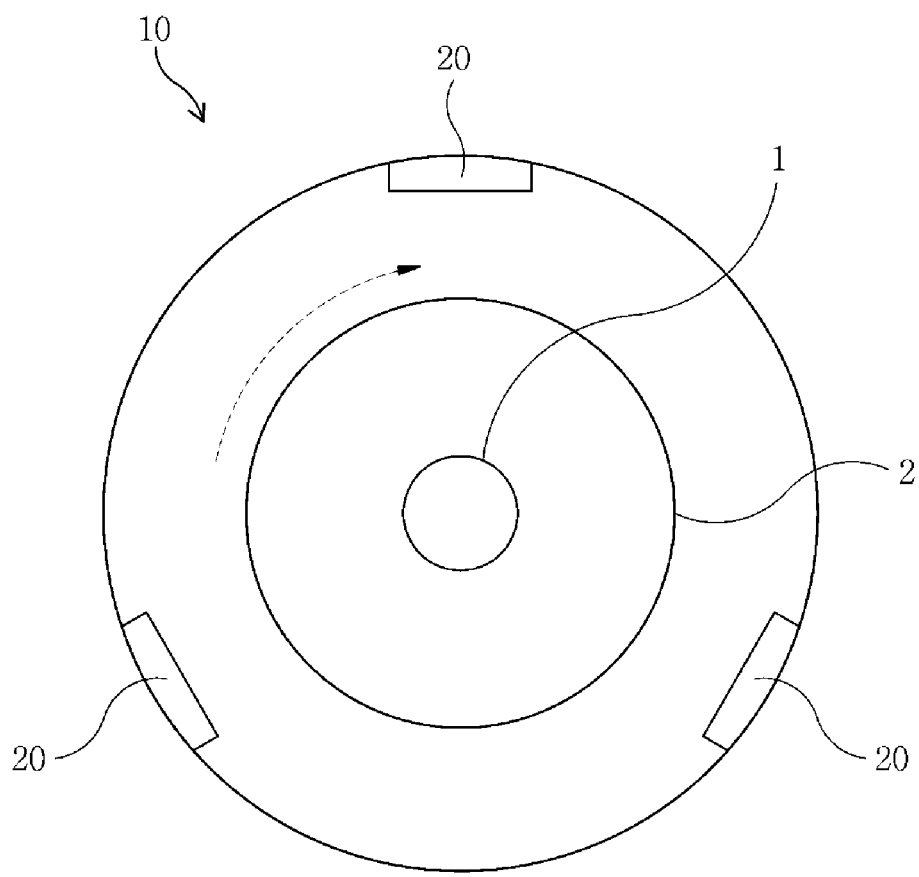
FIG. 1 is a diagram showing a shape of a motor having a digital Hall sensor according to an embodiment of the present disclosure.

In the following description, numerous specific details are set forth. However, it is understood that various embodiments of the disclosure are practiced without these specific details. In other instances, well-known functions or configurations have not been shown in detail in order not to obscure understanding of this description. The same reference numbers will be used throughout this specification to refer to the same or like parts.

The terms or words used in the present specification and claims described below are not to be construed with common or dictionary meanings but to be construed with meanings and concepts in accordance with the technical spirit of the present disclosure based on a principle that an inventor can define terms appropriately for the best explanation of his or her own disclosure. Embodiments described in the present specification and configurations shown in the drawings are merely exemplary embodiments of the present disclosure and do not represent all the spirit of the present disclosure. Thus, it is to be understood that there can be various equivalents and modifications at the filing date of the present disclosure.

The present disclosure relates to technology for estimating the internal temperature of a motor. Hereinafter, embodiments of the present disclosure will be described in detail with reference to the accompanying drawings.

FIG. 1 is a diagram showing a shape of a motor having a digital Hall sensor according to an embodiment of the present disclosure.

Referring to FIG. 1, a motor 10 includes a rotor 2 rotating about a rotation axis 1, and digital Hall sensors 20 detecting the position of the rotor 2 in accordance with rotation of the rotor 2 are disposed around the rotor 2. In FIG. 1, three digital Hall sensors 20 are disposed around the rotor 2, but the number and installation positions of digital Hall sensors 20 may be changed unlimitedly according to a design.

Here, the rotor 2 includes a permanent magnet, and the digital Hall sensors 20 detect the position of the rotor 2 using the Hall effect. The Hall effect is a phenomenon in which, when current flows perpendicular to a magnetic field through a conductor in a magnetic field, an electric field is generated perpendicular to both the magnetic field and the current. Using the Hall effect, the digital Hall sensors 20 may find the direction and magnitude of a magnetic field produced by the magnet of the rotor 2, and a relative position of the rotor 2 may be detected with respect to the digital Hall sensors 20.

Outputs of the digital Hall sensors 20 are proportional to the intensity of the magnetic field. The digital Hall sensors 20 of the present embodiment enter an operating period for outputting an on signal (a logic value of 1) when the intensity of the magnetic field becomes a predetermined value or more according to rotation of the rotor 2 including the magnet, and enter a release period for outputting an off signal (a logic value of 0) when the intensity of the magnetic field becomes less than the predetermined value again.

When a magnetic flux density G is a predetermined value or higher, the digital Hall sensors 20 enter the operating period, and a point at which the operating period begins is defined as an operating point. Also, when the magnetic flux density G is less than the predetermined value, the digital Hall sensors 20 enter the release period, and a point at which the release period begins is defined as a release point.

In FIG. 1, a brushless direct current (BLDC) motor in which the rotor 2 consists of a permanent magnet is shown as an example. However, the technical scope of the present disclosure is not limited thereto, and the technical spirit of the present disclosure can be also applied to a motor whose rotor consists of a coil, such as a DC motor. In this case, a digital Hall sensor is disposed at the rotor, and may detect the position of the rotor by sensing the magnetic field of a magnet disposed around the rotor.

A constitution and functions of an apparatus for estimating the temperature of a motor according to an embodiment of the present disclosure will be described in detail below with reference to FIG. 2.

Figure 2:
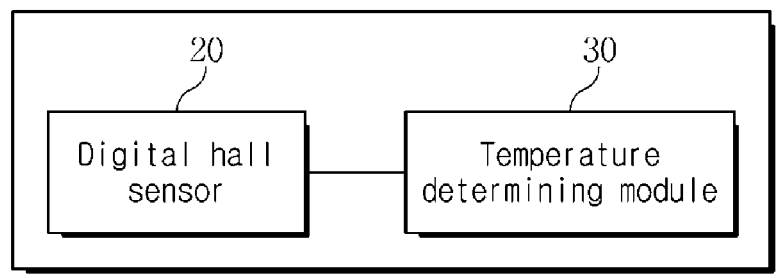
FIG. 2 is a block diagram of a temperature estimating apparatus according to an embodiment of the present disclosure.

FIG. 2 is a block diagram of a temperature estimating apparatus 100 according to an embodiment of the present disclosure. Referring to FIG. 2, the temperature estimating apparatus 100 of the present embodiment includes a digital Hall sensor 20 and a temperature determining module 30.

The digital Hall sensor 20 serves to detect the position of a rotor included in a motor and output a detection signal according to a relative position of the rotor with respect to the digital Hall sensor 20. In other words, when the rotor included in the motor rotates, a specific pole of a permanent magnet included in the rotor becomes relatively closer to or farther from the digital Hall sensor 20. Accordingly, a magnetic field sensed by the digital Hall sensor 20 varies and the position of the rotor can be detected.

When a magnetic flux density G exceeds a predetermined value according to the position of the rotor, the digital Hall sensor 20 enters the operating period and outputs an on signal indicating a logic value of 1. Also, when the magnetic flux density G is the predetermined value or less according to the position of the rotor, the digital Hall sensor 20 enters the release period and outputs an off signal indicating a logic value of 0. Here, the operating period ranges from an operating point to the following release point, and the release period ranges from a release point to the following operating point. The on signal of the operating period may have an output voltage of 5 V, and the off signal of the release period may have an output voltage of 0 V. Also, when the on signal has an output voltage of 0 V, the off signal may have an output voltage of −5 V. In this fashion, there can be various setting examples.

The temperature determining module 30 serves to calculate a difference between the duration of the operating period and the duration of the release period according to an output waveform of the digital Hall sensor 20 and to determine the temperature of the motor according to the duration difference.

By an output signal of the digital Hall sensor 20 that measures the temperature of the motor, the operating point at which the operating period begins and the release point at which the release period begins are changed in a rotational cycle of the rotor according to the temperature. Accordingly, the duration of the operating period and the duration of the release period are changed, and a difference between the duration of the operating period and the duration of the release period is also changed. Here, the duration difference has a unique value corresponding to the temperature of the motor.

When the difference between the duration of the operating period and the duration of the release period is calculated, the temperature determining module 300 of the present embodiment determines the internal temperature of the motor with reference to a temperature corresponding to the duration difference. Here, the temperature determining module 30 may previously store temperature information corresponding to duration differences therein, calculate a difference between the duration of the operating period and the duration of the release period from the output signal of the digital Hall sensor 20, and then determine the temperature of the motor by looking up information corresponding to the duration difference in the previously stored temperature information, thereby determining the temperature of the motor. In this case, the temperature determining module 30 may previously store temperature information corresponding to duration differences between the operating period and the release period, and the temperature information stored in this way may be created based on a data sheet provided by a manufacturer of the motor or the digital Hall sensor 20. The data sheet denotes any form of information relating to performance of the motor or the digital Hall sensor 20, and does not only denote information in the form of physical paper.

In an embodiment of the present disclosure, only when the calculated duration difference between the operating period and the release period has a value within a specific range, may the temperature determining module 30 determine the temperature of the motor. In general, irreversible demagnetization in which magnetic flux does not return to its original state occurs in the magnet included in the rotor of the motor at a high temperature of a predetermined value or more. Therefore, a matter of concern may be whether the temperature of the motor approaches the high temperature. At this time, if there is a tendency toward an increase in the duration difference between the operating period and the release period as the temperature increases, a process of determining the temperature of the motor may be performed to determine the temperature only when the duration difference is a predetermined value or more.

In another embodiment of the present disclosure, a plurality of temperatures may be determined as results of looking up a temperature corresponding to the duration difference calculated by the temperature determining module 30 in temperature information therein. For example, when the duration difference decreases and then increases as the internal temperature of the motor increases, a plurality of temperature values may correspond to a single duration difference value. In this case, the temperature determining module 30 may calculate the duration difference, determine temperatures of the motor according to the corresponding temperature values, and store information on the determined temperatures. Then, according to the determined temperatures, it is possible to determine which one of the plurality of temperatures is the actual temperature of the motor. In other words, assuming a case in which a temperature corresponding to a specific duration difference is determined to be plural in number, that is, 20 degrees and 40 degrees, the actual temperature may be determined by checking which one of 20 degrees and 40 degrees a temperature determined in a previous cycle is close to.

In another embodiment of the present disclosure, when a plurality of temperatures are determined to correspond to the duration difference calculated by the temperature determining module 30, it is possible to determine the actual temperature of the motor among the plurality of temperatures with reference to a time interval between an operating point at which the operating period begins in a specific cycle and an operating point at which the operating period begins in the next cycle. Assuming that a plurality of temperatures calculated by the temperature determining module 30 are, for example, 20 degrees and 40 degrees, a tendency for a time interval between operating points to change when the temperature of the motor is about 20 degrees and a tendency for a time interval between operating points to change when the temperature is about 40 degrees may differ from each other, and the temperature determining module 30 may determine the actual temperature of the motor with reference to the different tendencies. As an example, when the temperature of the motor is about 20 degrees, a time interval between operating points at which operating periods begin in consecutive cycles may tend to gradually decrease, but when the temperature is about 40 degrees, a time interval between operating points may tend to gradually increase. According to such a tendency for a time interval to change, the temperature determining module 30 can determine the actual temperature of the motor among the plurality of temperatures. In addition, when the temperatures of the motor are about 20 degrees and about 40 degrees, both time intervals between operating points may increase or decrease. At this time, there may be a difference between time interval change rates at the respective temperatures, and the temperature determining module 30 may determine the actual temperature of the motor among the plurality of temperatures with reference to such change rates.

In another embodiment of the present disclosure, when a plurality of temperatures are determined to correspond to the duration difference calculated by the temperature determining module 30, it is possible to determine the actual temperature of the motor among the plurality of temperatures with reference to a time interval between a release point at which the release period begins in a specific cycle and a release point at which the release period begins in the next cycle. Assuming that a plurality of temperatures calculated by the temperature determining module 30 are, for example, 20 degrees and 40 degrees, a tendency for a time interval between release points to change when the temperature of the motor is about 20 degrees and a tendency for a time interval between release points to change when the temperature is about 40 degrees may differ from each other, and the temperature determining module 30 may determine the actual temperature of the motor with reference to the different tendencies. As an example, when the temperature of the motor is about 20 degrees, a time interval between release points at which release periods begin in consecutive cycles may tend to gradually increase, but when the temperature is about 40 degrees, a time interval between release points may tend to gradually decrease. According to such a tendency for a time interval to change, the temperature determining module 30 can determine the actual temperature of the motor among the plurality of temperatures. In addition, when the temperatures of the motor are about 20 degrees and about 40 degrees, both time intervals between release points may increase or decrease. At this time, there may be a difference between time interval change rates at the respective temperatures, and the temperature determining module 30 may determine the actual temperature of the motor among the plurality of temperatures with reference to such change rates.

A configuration and functions of the temperature determining module 30 that determines the temperature of the motor according to an output signal of the digital Hall sensor 20 will be described with reference to FIG. 3.

Figure 3:
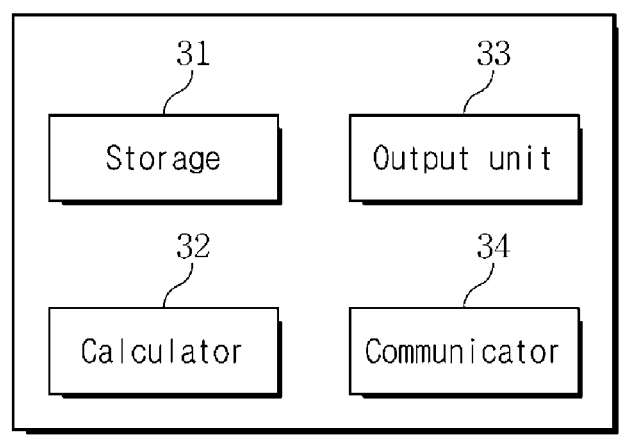
FIG. 3 is a block diagram of a temperature determining module according to an embodiment of the present disclosure.

FIG. 3 is a block diagram of a temperature determining module 30 according to an embodiment of the present disclosure.

Referring to FIG. 3, the temperature determining module 30 according to the present embodiment includes a storage 31, a calculator 32, an output unit 33, and a communicator 34.

The storage 31 stores temperature information on a motor corresponding to duration differences between the operating period and the release period of a digital Hall sensor. Here, the temperature information stored in the storage 31 may be created based on a data sheet provided by a manufacturer of the motor or the digital Hall sensor.

The calculator 32 serves to calculate a duration difference between the operating period and the release period according to an output signal of the digital Hall sensor prepared in the motor, and to determine the temperature of the motor by looking up a temperature corresponding to the duration difference in the storage 31. To this end, the calculator 32 may include a calculation unit, an application program storage, a memory, and so on.

The output unit 33 serves to output information on the temperature determined by the calculator 32, and may include a visual or aural output means such as a screen or a speaker for this purpose.

The communicator 34 serves to transmit the information on the temperature determined by the calculator 32 to the outside of the temperature determining module 30. The communicator 34 may transmit the temperature information using wired communication, wireless communication, or various signal lines, and includes a communication interface for this purpose.

In an embodiment of the present disclosure, the calculator 32 may determine the temperature of the motor only when a duration difference between the operating period and the release period has a value within a specific range. For example, when the duration difference is within the specific range, the temperature of the motor may be so high that there is a probability of damage to the motor. In this case, the calculator 32 may determine the temperature only when the duration difference is within a predetermined range. The information determined in this way may be output through the output unit 33 so that an administrator, etc. can recognize the information, or may be transmitted to an administrator device, etc. through the communicator 34.

When a plurality of temperatures are determined to correspond to the duration difference between the operating period and the release period, the calculator 32 may determine the actual temperature of the motor among the plurality of temperatures with reference to a temperature determined in a previous cycle.

Meanwhile, when a plurality of temperatures are determined to correspond to the duration difference, the calculator 32 may determine the actual temperature of the motor among the plurality of temperatures with reference to a time interval between an operating point at which the operating period begins in a specific cycle and an operating point at which the operating period begins in the next cycle, or a time interval between a release point at which the release period begins in a specific cycle and a release point at which the release period begins in the next cycle.

A method for a temperature determining module to determine the temperature of a motor according to an embodiment of the present disclosure will be described in further detail with reference to FIGS. 4 to 8.

Figure 4:
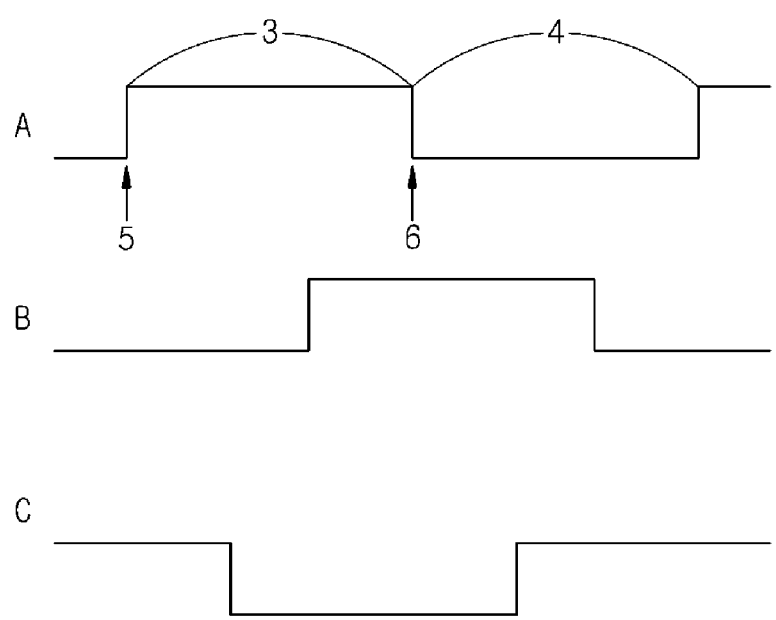
FIG. 4 is a diagram showing output waveforms of a digital Hall sensor according to an embodiment of the present disclosure.
Figure 5:
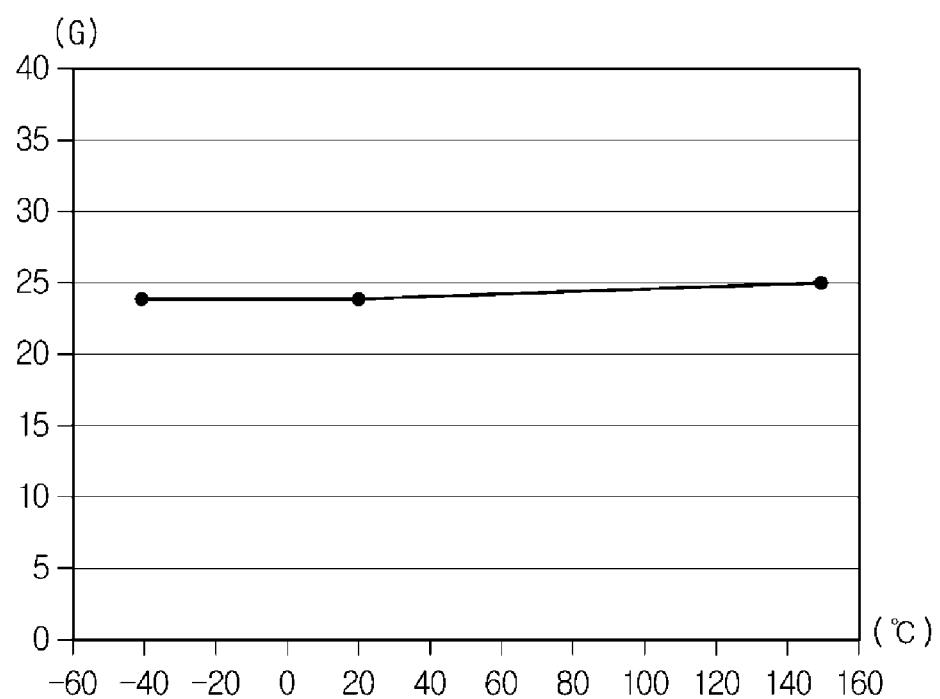
FIG. 5 is a graph showing a relationship between temperature and an operating point of a digital Hall sensor according to an embodiment of the present disclosure.
Figure 6:
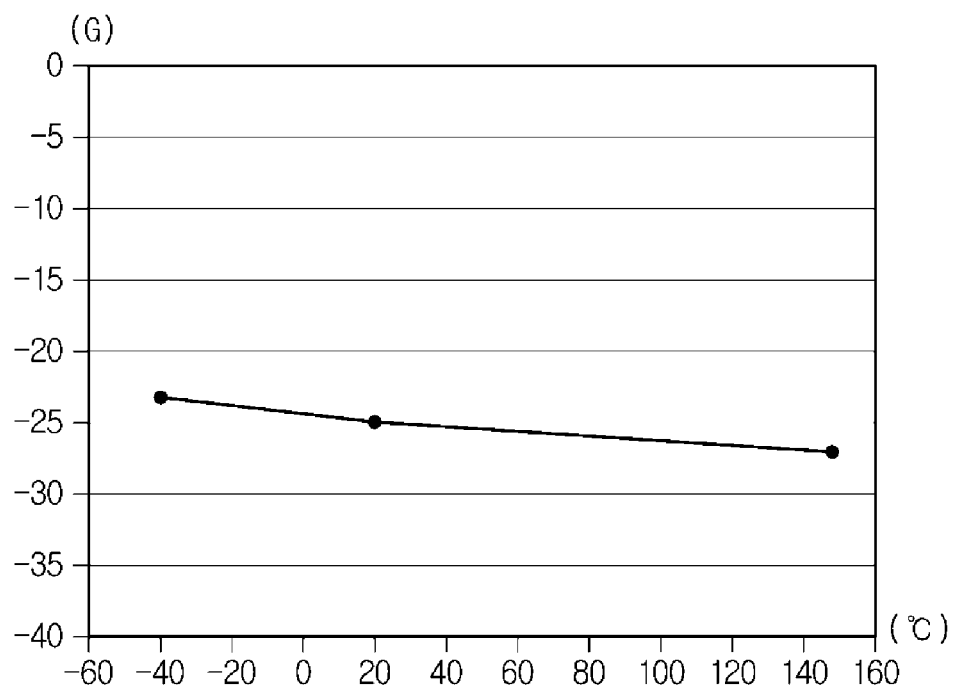
FIG. 6 is a graph showing a relationship between temperature and a release point of a digital Hall sensor according to an embodiment of the present disclosure.
Figure 7:
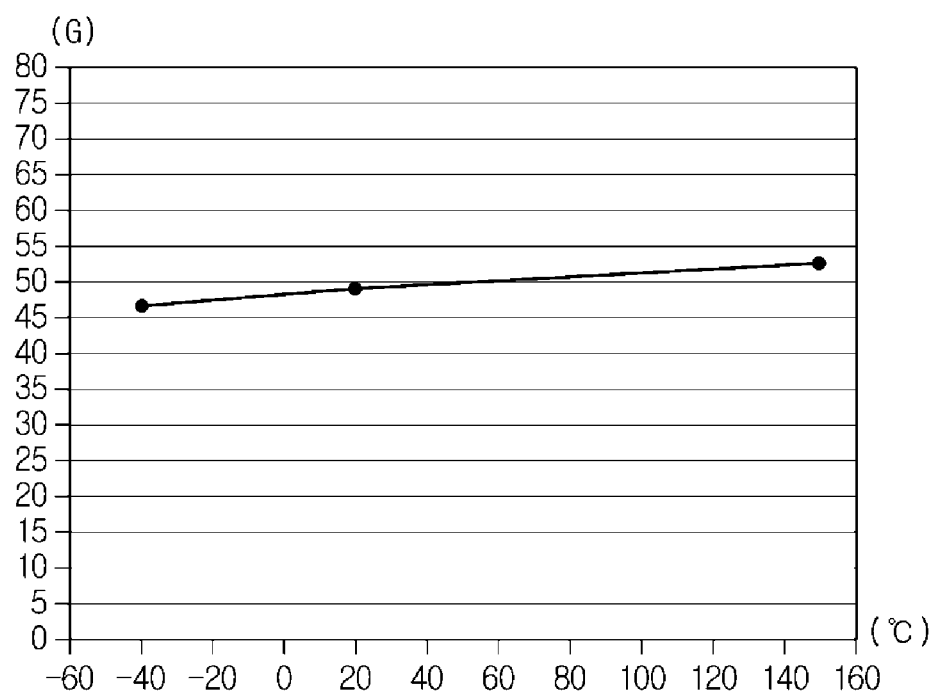
FIG. 7 is a graph showing a relationship between temperature and an operating period of a digital Hall sensor according to the embodiments of FIGS. 5 and 6.
Figure 8:
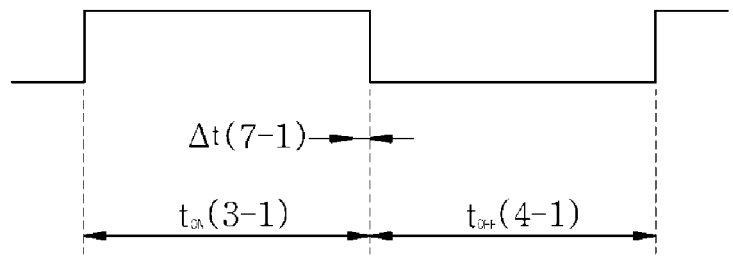
FIG. 8 is a diagram showing a duration difference between an operating period and a release period varying with temperature according to an embodiment of the present disclosure.
Figure 8:
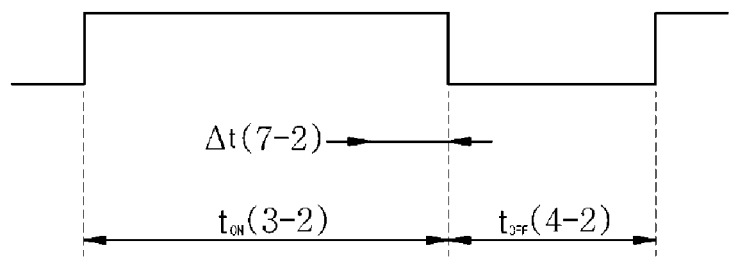

FIG. 4 is a diagram showing output waveforms of a digital Hall sensor according to an embodiment of the present disclosure. FIG. 5 is a graph showing a relationship between temperature and an operating point of a digital Hall sensor according to an embodiment of the present disclosure, and FIG. 6 is a graph showing a relationship between temperature and a release point of a digital Hall sensor according to an embodiment of the present disclosure. FIG. 7 is a graph showing a relationship between temperature and the operating period of a digital Hall sensor according to the embodiments of FIGS. 5 and 6. FIG. 8 is a diagram showing a duration difference between the operating period and the release period varying with temperature according to an embodiment of the present disclosure.

Referring to FIGS. 1 to 8, FIG. 4 shows output waveforms A, B, and C of the three digital Hall sensors 20 installed in the motor 10 of FIG. 1.

In FIG. 4, the output waveforms A, B, and C of the digital Hall sensors 20 have phase differences of 120 degrees, and each of the output waveforms A, B, and C has an operating period 3 and a release period 4. In other embodiments, output waveforms may vary according to the number of digital Hall sensors 20.

FIG. 5 shows how an operating point 5 at which the operating period 3 begins in the output waveform A of a single digital Hall sensor 20 shown in FIG. 4 varies with temperature.

In FIG. 5, the horizontal axis denotes the internal temperature (° C.) of the motor 10, and the vertical axis denotes the magnetic flux density G for the digital Hall sensor 20 to enter the operating period 3. In other words, when the digital Hall sensor 20 senses a value of the magnetic flux density G corresponding to a specific temperature (° C.) or higher at the specific temperature (° C.), the digital Hall sensor 20 enters the operating period 3. In FIG. 5, a value of the magnetic flux density G corresponding to a temperature (° C.) tends to increase together with the temperature, and as the temperature increases, the operating point 5 at which the operating period 3 begins is delayed.

FIG. 6 shows how a release point 6 at which the release period 4 begins in the output waveform A of the single digital Hall sensor 20 shown in FIG. 4 varies with temperature.

In FIG. 6, a horizontal axis denotes the internal temperature (° C.) of the motor 10, and a vertical axis denotes the magnetic flux density G for the digital Hall sensor 20 to enter the release period 4. In other words, when the digital Hall sensor 20 senses less than a value of the magnetic flux density G corresponding to a specific temperature (° C.) at the specific temperature (° C.), the digital Hall sensor 20 enters the release period 4. In FIG. 6, a value of the magnetic flux density G corresponding to a temperature (° C.) tends to decrease together with the temperature, and as the temperature increases, the release point 6 at which the release period 4 begins is delayed.

Referring to FIGS. 5 and 6, the degree of increase in the magnetic flux density G corresponding to the operating point 5 along with an increase in the temperature (° C.) in FIG. 5 is smaller than the degree of decrease in the magnetic flux density G corresponding to the release point 6 along with an increase in the temperature (° C.) in FIG. 6. This denotes that the release point 6 is delayed more than the operating point 5.

FIG. 7 shows temperature-specific values of the magnetic flux density G obtained by subtracting the value of the magnetic flux density G corresponding to the release point 6 of FIG. 6 from the value of the magnetic flux density G corresponding to the operating point 5 of FIG. 5. In FIG. 7, the resultant value tends to increase in proportion to temperature, denoting a tendency for a duration difference between the operating period 3 and the release period 4 to gradually increase.

FIG. 8 shows duration differences 7-1 and 7-2 between an operating period 3-1 and a release period 4-1 and between an operating period 3-2 and a release period 4-2 in output waveforms of a digital Hall sensor 20 according to temperature.

Here, the duration differences 7-1 and 7-2 are calculated by the following equation:

$$\Delta t = t_{on} - t_{off}$$

$\Delta t$: duration difference $t_{on}$: duration of an operating period $t_{off}$: duration of a release period The upper waveform in FIG. 8 indicates a case in which the temperature of the motor 10 is relatively low, and in this case, the duration difference 7-1 between the operating period 3-1 and the release period 4-1 has a relatively small value. On the other hand, the lower waveform in FIG. 8 indicates a case in which the temperature of the motor 10 is relatively high, and in this case, the duration difference 7-2 between the operating period 3-2 and the release period 4-2 has a relatively large value. In this way, the output waveform of the digital Hall sensor 20 varies with the internal temperature of the motor 10, and by calculating the duration differences 7-1 and 7-2 between the operating period 3-1 and the release period 4-1 and between the operating period 3-2 and the release period 4-2, it is possible to inversely estimate the temperature of the motor 10 corresponding to the duration differences 7-1 and 7-2.

A process of estimating the temperature of the motor 10 according to an embodiment of the present disclosure will be described in further detail with reference to FIG. 9.

Figure 9:
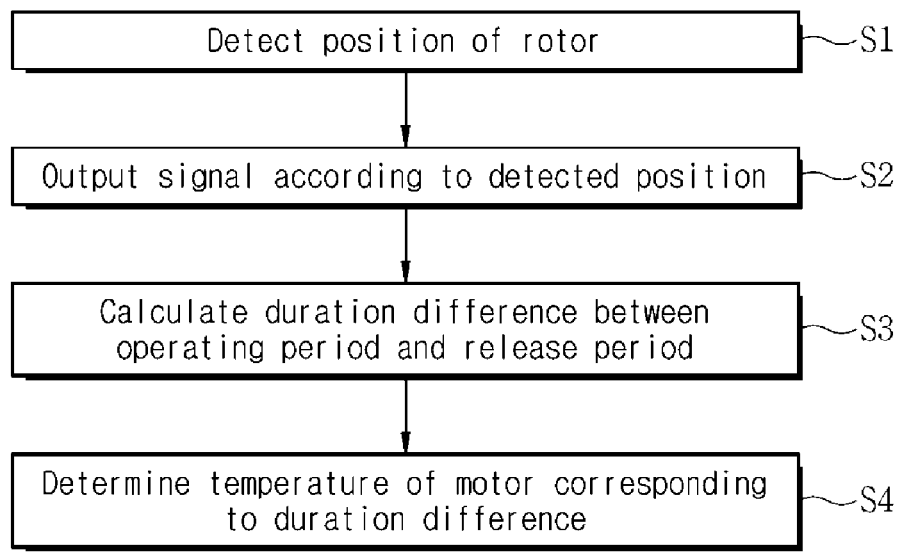
FIG. 9 is a flowchart illustrating a method of estimating a temperature according to an embodiment of the present disclosure.

FIG. 9 is a flowchart illustrating a method of estimating a temperature according to an embodiment of the present disclosure.

Referring to FIG. 9, a digital Hall sensor installed in a motor detects the position of a rotor according to rotation of the rotor including a permanent magnet using the Hall effect (S1).

Then, the digital Hall sensor outputs a signal according to the position detected in step S1 (S2).

In step S2, the digital Hall sensor enters the operating period for outputting an on signal (a logic value of 1) when a magnetic field sensed according to rotation of the rotor including the magnet has an intensity of a predetermined value or more, and enters the release period for outputting an off signal (a logic value of 0) when the intensity falls below the predetermined value.

Subsequently, a temperature determining module calculates a duration difference between the operating period and the release period according to the signal output in step S2 (S3).

In step S3, the duration of the operating period denotes a time from an operating point at which the operating period begins to a release point at which the following release period begins. Also, in step S3, the duration of the release period denotes a time from a release point at which the release period begins to an operating point at which the following operating period begins.

Then, the temperature determining module determines the temperature of the motor corresponding to the duration difference calculated in step S3 (S4).

By the output signal of the digital Hall sensor that measures the temperature of the motor, an operating point at which the operating period begins and a release point at which the release period begins are changed in a rotational cycle of the rotor according to the temperature. Accordingly, the duration of the operating period and the duration of the release period are changed, and a difference between the duration of the operating period and the duration of the release period is also changed. Here, the duration difference has a unique value corresponding to the temperature of the motor. In step S4, the temperature determining module determines the internal temperature of the motor with reference to a temperature corresponding to the difference between the duration of the operating period and the duration of the release period.

Before step S4, the temperature determining module may perform a process of storing temperature information corresponding to the difference between the duration of the operating period and the duration of the release period. The temperature information stored at this time may be created based on a data sheet provided by a manufacturer of the motor or the digital Hall sensor.

In step S4, the temperature determining module may perform the operation of determining the temperature of the motor when the duration difference between the operating period and the release period has a value within a specific range.

Meanwhile, in step S4, when a plurality of temperatures correspond to the duration difference, the temperature determining module may determine the actual temperature of the motor among the plurality of temperatures with reference to a temperature determined in a previous cycle.

Alternatively, in step S4, the temperature determining module may determine the actual temperature of the motor among the plurality of temperatures with reference to a time interval between an operating point at which the operating period begins in a specific cycle and an operating point at which the operating period begins in the next cycle, or a time interval between a release point at which the release period begins in a specific cycle and a release point at which the release period begins in the next cycle.

An apparatus and method for estimating a temperature of a motor using a Hall sensor according to embodiments of the present disclosure enable the internal temperature of a motor to be estimated without installing a temperature sensor in the motor, a size of the motor to remain small, and production costs to be reduced.

In addition, the internal temperature of a motor can be measured using a digital Hall sensor that is more robust against noise than an analog Hall sensor, and by controlling or stopping operation of the motor according to a temperature estimation result, it is possible to prevent damage to the motor and extend the life span of the motor.

The temperature estimating method according to some embodiments of the present disclosure is implemented as program commands that can be executed by various computer systems and be recorded in any non-transitory medium, and written to a computer-readable recording medium. The computer-readable recording medium includes programs, data files, data structures, etc. alone or in combination. The program commands written to the medium are designed or configured especially for the present disclosure, or known to those skilled in computer software. Examples of the computer-readable recording medium include magnetic media such as a hard disk, a floppy disk, and a magnetic tape, optical media such as a CD-ROM and a DVD, magneto-optical media such as a floptical disc, and a hardware device configured especially to store and execute a program command, such as a ROM, a RAM, and a flash memory. Examples of a program command include a premium language code executable by a computer using an interpreter as well as a machine language code generated by a compiler. The hardware device is configured to operate as one or more software modules to implement the present disclosure or vice versa. In some embodiments, one or more of the processes or functions described herein is/are performed by specifically configured hardware (e.g., by one or more application specific integrated circuits or ASIC(s)). Some embodiments incorporate more than one of the described processes in a single ASIC. In some embodiments, one or more of the processes or functions described herein is/are performed by at least one processor which is programmed for performing such processes or functionality.

The detailed description of the preferred embodiments of the present disclosure has been given to enable those skilled in the art to implement and practice the disclosure. Although the disclosure has been described with reference to the various embodiments, those skilled in the art will appreciate that various modifications and variations can be made in the present disclosure without departing from the subject matter, spirit and scope of the disclosure. Specific terms used in this disclosure and drawings are used for illustrative purposes and are not to be considered as limitations of the present disclosure.

What is claimed is:

1. A method of estimating a temperature of a motor using a Hall sensor, the method comprising the steps of:
   detecting, at a digital Hall sensor, a position of a rotor included in a motor, and outputting an on signal in an operating period and an off signal in a release period according to a relative position of the rotor;
   calculating, at a temperature determining module, a difference between duration of the operating period and duration of the release period according to an output waveform of the digital Hall sensor; and
   determining, at the temperature determining module, a temperature of the motor with reference to a temperature corresponding to the duration difference.

2. The method of claim 1, wherein the step of determining the temperature includes, when the duration difference has a value within a specific range, determining the temperature of the motor.

3. The method of claim 1, wherein the step of determining the temperature includes, when a plurality of temperatures correspond to the duration difference, determining the actual temperature of the motor among the plurality of temperatures with reference to a temperature determined in a previous cycle.

4. The method of claim 1, wherein the step of determining the temperature includes, when the temperature determining module determines that a plurality of temperatures correspond to the duration difference, determining the actual temperature of the motor among the plurality of temperatures with reference to a time interval between an operating point at which the operating period begins in a specific cycle and an operating point at which the operating period begins in a next cycle.

5. The method of claim 1, wherein the step of determining the temperature includes, when the temperature determining module determines that a plurality of temperatures correspond to the duration difference, determining the actual temperature of the motor among the plurality of temperatures with reference to a time interval between a release point at which the release period begins in a specific cycle and a release point at which the release period begins in a next cycle.

6. The method of claim 1, further comprising, before the step of determining the temperature, storing temperature information corresponding to the duration difference between the operating period and the release period,
wherein the step of determining the temperature includes determining the temperature of the motor with reference to the stored temperature information.

7. The method of claim 6, wherein the temperature information corresponding to the duration difference between the operating period and the release period is created based on a data sheet provided by a manufacturer of the motor or the digital Hall sensor.

8. An apparatus for estimating a temperature of a motor using a Hall sensor, the apparatus comprising:
a digital Hall sensor configured to detect a position of a rotor included in a motor, and output an on signal in an operating period and an off signal in a release period according to a relative position of the rotor; and
a temperature determining module configured to calculate a difference between duration of the operating period and duration of the release period according to an output waveform of the digital Hall sensor, and determine a temperature of the motor with reference to a temperature corresponding to the duration difference.

9. The apparatus of claim 8, wherein, when the duration difference has a value within a specific range, the temperature determining module determines the temperature of the motor.

10. The apparatus of claim 8, wherein, when a plurality of temperatures correspond to the duration difference, the temperature determining module determines the actual temperature of the motor among the plurality of temperatures with reference to a temperature determined in a previous cycle.

11. The apparatus of claim 8, wherein, when a plurality of temperatures correspond to the duration difference, the temperature determining module determines the actual temperature of the motor among the plurality of temperatures with reference to a time interval between an operating point at which the operating period begins in a specific cycle and an operating point at which the operating period begins in a next cycle.

12. The apparatus of claim 8, wherein, when a plurality of temperatures correspond to the duration difference, the temperature determining module determines the actual temperature of the motor among the plurality of temperatures with reference to a time interval between a release point at which the release period begins in a specific cycle and a release point at which the release period begins in a next cycle.

13. The apparatus of claim 8, wherein the temperature determining module includes:
a storage configured to store temperature information on the motor corresponding to the duration difference between the operating period and the release period;
a calculator configured to calculate the duration difference and look up a temperature corresponding to the duration difference in the storage; and
at least one of an output unit configured to output information on the temperature looked up by the calculator, and a communicator configured to transmit the information on the temperature looked up by the calculator.

14. The apparatus of claim 13, wherein the temperature information stored in the storage is created based on a data sheet provided by a manufacturer of the motor or the digital Hall sensor.

15. An apparatus for estimating a temperature of a motor using a Hall sensor, the apparatus comprising:
a motor including a rotor;
a digital Hall sensor configured to detect a position of the rotor, and output an on signal in an operating period and an off signal in a release period according to a relative position of the rotor; and
a temperature determining module configured to calculate a difference between duration of the operating period and duration of the release period according to an output waveform of the digital Hall sensor, and determine a temperature of the motor with reference to a temperature corresponding to the duration difference.

* * * * *